(12) United States Patent
Chou

(10) Patent No.: US 9,797,394 B2
(45) Date of Patent: Oct. 24, 2017

(54) AIR COMPRESSOR

(71) Applicant: Wen-San Chou, Tainan (TW)

(72) Inventor: Wen-San Chou, Tainan (TW)

(*) Notice: Subject to any disclaimer, the term of this patent is extended or adjusted under 35 U.S.C. 154(b) by 213 days.

(21) Appl. No.: 14/873,892

(22) Filed: Oct. 2, 2015

(65) Prior Publication Data

US 2016/0097383 A1    Apr. 7, 2016

(51) Int. Cl.
| | | |
|---|---|---|
| F04B 39/12 | (2006.01) | |
| G01L 7/16 | (2006.01) | |
| F04B 49/22 | (2006.01) | |
| F04B 35/04 | (2006.01) | |
| F04B 39/14 | (2006.01) | |
| F04B 41/02 | (2006.01) | |
| G01L 19/10 | (2006.01) | |
| F04B 35/00 | (2006.01) | |
| F04B 39/10 | (2006.01) | |
| F04B 53/14 | (2006.01) | |
| G01L 19/16 | (2006.01) | |

(52) U.S. Cl.
CPC .............. *F04B 49/22* (2013.01); *F04B 35/00* (2013.01); *F04B 35/04* (2013.01); *F04B 39/10* (2013.01); *F04B 39/121* (2013.01); *F04B 39/122* (2013.01); *F04B 39/123* (2013.01); *F04B 39/125* (2013.01); *F04B 39/14* (2013.01); *F04B 41/02* (2013.01); *F04B 53/14* (2013.01); *G01L 7/163* (2013.01); *G01L 7/166* (2013.01); *G01L 19/10* (2013.01); *G01L 19/16* (2013.01)

(58) Field of Classification Search
CPC .......... F04B 49/22; F04B 35/00; F04B 35/04; F04B 39/121; F04B 39/122; F04B 39/123; F04B 39/125; F04B 39/10; F04B 39/14; F04B 41/02; F04B 53/14; G01L 7/163; G01L 7/166; G01L 19/16
USPC .......... 417/63, 468, 469, 550, 374, 415, 545, 417/360, 423.15
See application file for complete search history.

(56) References Cited

U.S. PATENT DOCUMENTS

| | | | | |
|---|---|---|---|---|
| 5,352,096 A | * | 10/1994 | Chi-Wen ................. | F04B 49/02 417/12 |
| 6,135,725 A | * | 10/2000 | Chou ...................... | F04B 35/04 417/360 |
| 6,783,333 B2 | * | 8/2004 | Wang ..................... | F04B 35/01 417/307 |
| 6,846,162 B2 | * | 1/2005 | Chou ..................... | F04B 35/04 417/307 |

(Continued)

Primary Examiner — Nathan Zollinger

(57) ABSTRACT

An improved air compressor includes a cylinder fitted with a piston body and an air storage container. The cylinder and the air storage container are detachably assembled to define an air chamber. A metal seat with a through hole is provided on top of the cylinder. A valve plug is spring-biased against the metal seat. The air storage container is provided with a pressure indicator, which includes a tube defining therein a first bore and a second bore, between which a tapered annular surface is formed. When the air pressure within the air storage container exceeds a predetermined pressure set for the air compressor, the pressure indicator allows excess air to flow into the first bore of the tube and sequentially pass through the tapered annular surface and an elongated opening to be released to the ambient environment, so that objects can be prevented from damages due to excessive inflations.

5 Claims, 13 Drawing Sheets

(56) References Cited

U.S. PATENT DOCUMENTS

| | | | | |
|---|---|---|---|---|
| 7,240,642 B2 * | 7/2007 | Chou | ................... | F04B 39/123 123/41.35 |
| 7,462,018 B2 * | 12/2008 | Chou | ................... | F04B 35/04 417/415 |
| 7,547,201 B2 * | 6/2009 | Chou | ................... | B29C 73/166 277/438 |
| 8,747,083 B2 * | 6/2014 | Chou | ................... | F04B 35/04 137/538 |
| 9,011,118 B2 * | 4/2015 | Chou | ................... | F04B 35/01 417/545 |
| 9,328,725 B2 * | 5/2016 | Chou | ................... | F04B 39/123 |
| 9,562,821 B2 * | 2/2017 | Chou | ................... | F04B 35/01 |
| 2015/0078920 A1 * | 3/2015 | Chou | ................... | F04B 41/02 417/63 |
| 2015/0285237 A1 * | 10/2015 | Chou | ................... | F04B 39/121 417/415 |
| 2016/0097379 A1 * | 4/2016 | Chou | ................... | F04B 35/04 417/374 |
| 2016/0097383 A1 * | 4/2016 | Chou | ................... | F04B 35/00 417/63 |

\* cited by examiner

AIR COMPRESSOR

The present invention relates to an air compressor and, more particularly, to an improved air compressor, which claims the Taiwan priority filing date of Oct. 7, 2014 of the Application No. 103134920.

TECHNICAL FIELD OF THE INVENTION

The present invention relates to an air compressor and, more particularly, to an improved air compressor, wherein an air storage container and a cylinder thereof can be detachably assembled to define an air chamber, an air passage design between the air storage container and the cylinder is provided for reducing the motion resistance of a piston body within the cylinder so that the piston body can conduct reciprocating motion more smoothly, a metal seat is embedded as a top element of the air passage design between the air storage container and the cylinder to ensure the sealing function of a valve plug thereof, and a pressure indicator is provided for an outlet of the air storage container for indicating the pressure of compressed air within the air storage container and releasing excess compressed air into the ambient environment without additional pressure relief valves, so that objects will not be excessively inflated to cause damages.

DESCRIPTION OF THE PRIOR ART

Conventionally, air compressors, especially the small air compressors being used for inflating objects such as tires and air cushions, employ an air storage container formed integrally on a cylinder to produce compressed air, wherein an air port is provided between the air storage container and the cylinder, and a valve plug is urged by a spring to normally seal the air port, one end of the spring being engaged with the valve plug, and the other end of the spring being attached by bolts to a top cap that is used to close a top opening of the air storage container. The disadvantage is that the valve plug and the spring are difficult to be assembled into the air storage container.

Generally, conventional air compressors are provided with two outlets or ducts, one of which is installed with a circular pressure gauge and the other of which is connected with a hose that is provided with an air nozzle for inflating an object such as a tire. The circular pressure gauge can show the pressure of the compressed air within the air storage container for users. Since the circular pressure gauge, which employs a Bourdon tube as a pressure sensor, contains precision components, when it falls to the ground or experiences a large impact, the pressure gauge is prone to be damaged and thus loses its accuracy.

In view of the foregoing, there is a need to provide an improved air compressor, wherein an air storage container and a cylinder thereof can be detachably assembled to define an air chamber, an air passage design between the air storage container and the cylinder is provided for reducing the motion resistance of a piston body so that the piston body can conduct reciprocating motion more smoothly, and a robust pressure indicator is provided for indicating the air pressure within the air storage container and releasing excess air into the ambient environment, without installing additional pressure relief valves, when the air pressure exceeds a predetermined pressure set for the air compressor.

SUMMARY OF THE INVENTION

One object of the present invention is to provide an improved air compressor, wherein an air storage container and a cylinder thereof can be detachably assembled to define an air chamber, and an air passage design between the air storage container and the cylinder is provided for reducing the motion resistance of a piston body within the cylinder so that the piston body can conduct reciprocating motion more smoothly.

Another object of the present invention is to provide an improved air compressor, wherein a metal seat is embedded as a top element of the air passage design between the air storage container and the cylinder to ensure the sealing function of a valve plug thereof.

A further object of the present invention is to provide an improved air compressor, wherein a pressure indicator is provided for an outlet thereof for indicating the pressure of compressed air within the air storage container and releasing excess compressed air into the ambient environment without additional pressure relief valves, so that objects will not be excessively inflated excessively cause damages.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
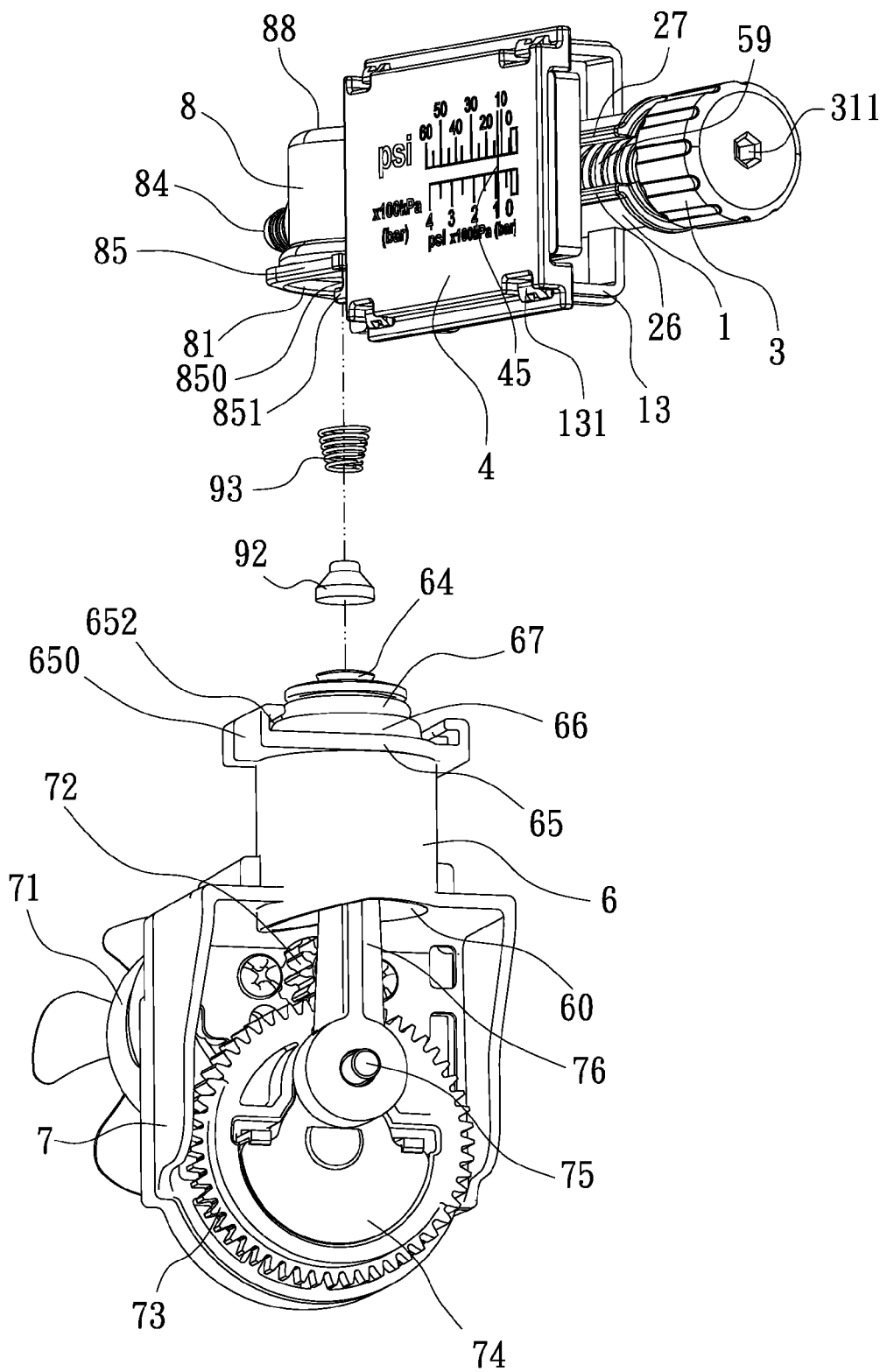
FIG. 1 shows an exploded view of an air compressor according to one embodiment of the present invention, wherein the air storage container is disassembled from the cylinder.

Referring to FIGS. 1 through 7, an improved air compressor according to one embodiment of the present invention is shown, wherein a motor 71 is mounted to a main frame 7, and a small gear 72 is fitted to an output axle of the motor 71. Furthermore, a large gear 73 is mounted to the main frame 7 to be engaged with the small gear 72. A cylinder 6 is provided at the main frame 7. A piston body 76, which conducts reciprocating motion within the cylinder 6, is pivotally connected to a crank pin 75 that is fixed to a counterweight 74 being attached to the large gear 73. The motor 71 can drive the small gear 72 to rotate the large gear 73, which swings the crankpin 75 to cause the piston body 76 to conduct reciprocation motion within the cylinder 6 for producing compressed air.

Figure 7:
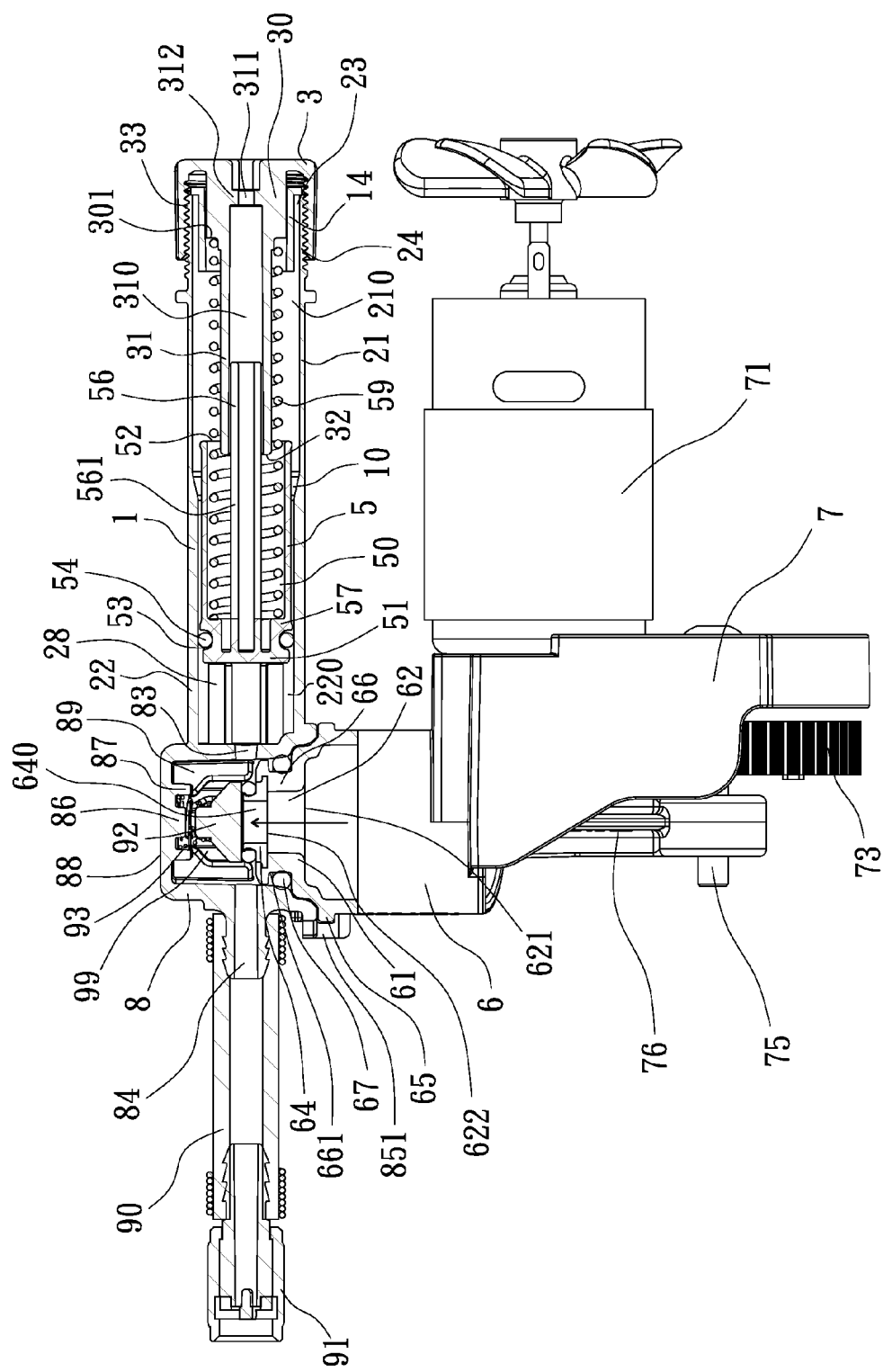
FIG. 7 shows a sectional view of the pressure indicator used in the present invention, wherein the slider is at its original position (the air compressor is stopped).

The cylinder 6 has an open bottom 60, through which the piston body 76 can be fitted into the cylinder 6, and a top wall 61, on which a tubular projection 66 is formed (see FIG. 7). The tubular projection 66 defines therein a first through hole 62 including a first end 621 and a second end 622, wherein the first through hole 62 communicates with the cylinder 6 at its first end 621. A metal seat 64, which defines a second through hole 640, is provided on the tubular projection 66. More specifically, the metal seat 64 is integrally embedded in the tubular projection 66, wherein the first through hole 62 communicates with the second through hole 640 at its second end 622. The first through hole 62 of the tubular projection 66 and the second through hole 640 of the metal seat 64 constitute an air passage that communicates the air storage container 8 with the cylinder 6. The tubular projection 66 defines an annular groove 661 at its outer surface to be fitted with a seal ring 67. The cylinder 6 is provided with a first flange 65 at its surrounding wall, near its top wall 61. The first flange 65 is provided with two opposite U-shaped holding portions 650, each of which defines a first recess 652.

A cylindrical air storage container 8 has an open bottom 81 and a closed top 88 and defines therein an inner space 82 terminating at the open bottom 81. A plurality of spaced-apart ribs 89 is provided at an inner surface of the air storage container 8. The air storage container 8 is provided at its open bottom 81 with a second flange 85 of appropriate thickness, which is provided with two opposite U-shaped holding portions 851, each of which defines a second recess 850. A central column 86 is provided at an inner surface of the closed top 88 of the air storage container 8 and extends downwardly at a predetermined distance. An annular protrusion 87 is provided at the inner surface of the closed top 88 of the air storage container 8, around the central column 86, thus defining an annular groove 80 therebetween.

A valve plug 92, usually made of plastic, is placed on the metal seat 64 for sealing the second through hole 640 thereof. In operation, the valve plug 92 may be moved at a high frequency, which tends to increase the temperature of the metal seat 64. Since the metal seat 64 can undergo deformation due to high temperature, so that the sealing function of the valve plug 92 will not be affected. The air storage container 8 can be fitted over the cylinder 6 and rotated about the cylinder 6 to allow the second flange 85 of the air storage container 8 to slide in the first recesses 652 of the cylinder 6 and allow the first flange 65 of the cylinder 6 to slide in the second recess 850 of the air storage container 8, so that the air storage container 8 is detachably mounted to the cylinder 6, thereby sealing the cylinder 6 and defining an air chamber 99 therebetween (see FIGS. 1, 2 and 7). This design facilitates a user to assemble the compression spring 93 and the valve plug 92 into the air storage container 8. After mounting the air storage container 8 onto the cylinder 6, one end of the compression spring 93 is urged against the valve plug 92 while the other end of the compression spring 93 is fitted around the central column 86 and received in the annular groove 80. The central column 86 can limit the upward movement of the valve plug 92. The length of the central column 86 can affect the speed of the valve plug 92 sealing the second through hole 640 of the metal seat 64. A longer column will limit the movement of the valve plug 92 more than a shorter column. Thus, if the central column 86 is long, the valve plug 92 will seal the second through hole 640 quickly. On the other hand, if the central column 86 is short, the valve plug 92 will seal the second through hole 640 slowly. The air chamber 99 defined between the air storage container 8 and the metal seat 64 can receive the compressed air from the cylinder 6. In this embodiment, at least two outlets 83, 84 are provided at the air storage container 8, wherein the outlet 83 is joined with a pressure indicator, and the outlet 84 is connected with a hose 90 including an air nozzle 91. The pressure indicator generally includes a tube 1, a cap 3, a stationary transparent plate 4, a slider 5, and a sleeve 14.

Figure 5:
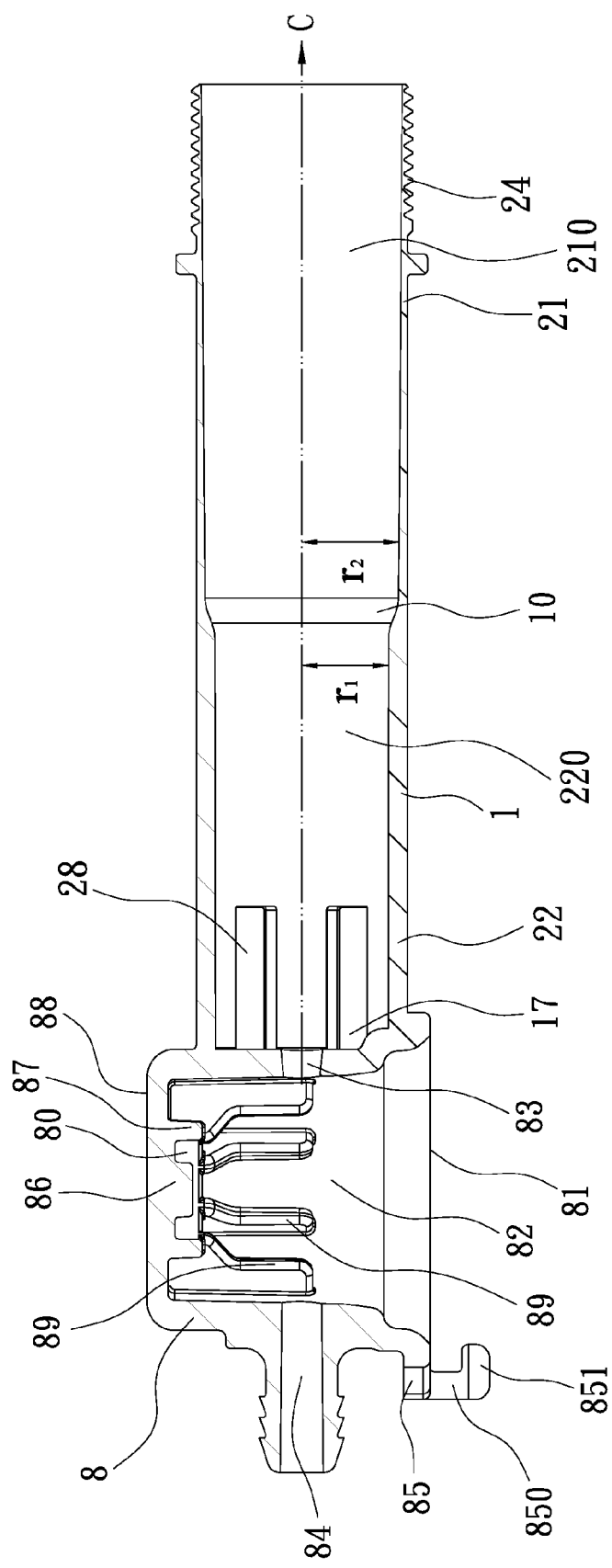
FIG. 5 shows a sectional view of the air storage container with the tube of the pressure indicator.

The tube 1 has a first segment 21 and a second segment 22. The second segment 22, which is joined to the outlet 83 of the air storage container 8, defines therein a second bore 220. The first segment 21, which is formed integrally with the second segment 22, has an open end 23 and defines therein a first bore 210 that communicates with the second bore 220 and terminates at its open end 23. As shown in FIG. 5, the first bore 210 of the first segment 21 has a radius of r2 while the second bore 220 of the second segment 22 has a radius of r1, wherein r2 is greater than r1. Thus, a tapered annular surface 10 is formed between an inner surface of the first segment 21, which defines the first bore 210, and an inner surface of the second segment 22, which defines the second bore 220. The tapered annular surface 10, which is a generally conic surface for connecting the two tube segments, has a radius of r1 at its left and a radius of r2 at its right. Although this embodiment provides the tapered annular surface 10, which extends outwardly with the central axis C of the tube 1 in a linear path, a curved annular surface, which extends outwardly with the axis C of the transparent tube 1 in a curved path, can be used as well. Furthermore, the first segment 21 defines at its surrounding wall an elongated opening 25, with two opposing side rails 26, 27, extending from the tapered annular surface 10 to its open end 23. A plurality of buffering blocks 28 is provided at the surrounding wall of the air storage container 8, around the outlet 83. The tube 1 is provided at the open end 23 of the first segment 21 with external threads 24. Furthermore, the tube 1 is provided at its surrounding wall with four L-shaped fixing arms 13, each fixing arm being provided with a snap-fitting hook 131 at its end.

The stationary transparent plate 4, which is a generally rectangular structure, has two side flanges 41 respectively at its top and bottom sides and defines a recessed space 43 at its back surface, between the two side flanges 41, wherein the recessed space 43 is parallel to the extending direction of the tube 1. The stationary transparent plate 4 defines at the side flanges 41 four openings 42, which can be inserted by the snap-fitting hooks 131 of the fixing arms 13, so that the stationary transparent plate 4 can be detachably fixed onto the tube 1. Furthermore, the stationary transparent plate 4 has a first sidewall 40 at its left side and is provided with a marking line 45 thereon.

The slider 5 generally includes a hollow cylindrical body and a panel 58. The hollow cylindrical body has a closed end 51 and an open end 52 and defines therein an inner space 50 that terminates at the open end 52. The cylindrical body of the slider 5 is provided with a first central tube 56 that extends from an inner surface of its closed end 51 and extends through its inner space 50. The first central tube 56 of the slider 5 defines at its surrounding wall a plurality of slits 561 extending along its lengthwise direction. The closed end 51 of the hollow cylindrical body of the slider 5 is formed with an inner step 57 around the first central tube 56. The hollow cylindrical body of the slider 5 defines an annular groove 53 at its surrounding wall, near its closed end 51, to be fitted with a colored O-ring 54. As such, the compressed air from the air storage container 8 can force the slider 8 to move towards the open end 52 of the tube 1. The displacement of the slider 5 can reflect the pressure of the compressed air.

The panel 58, being a generally rectangular structure, is joined to the hollow cylindrical body of the slider 5 through a neck portion 55 formed at the outer surface of the hollow cylindrical body, near the open end 52, such that the panel 58 is parallel to the hollow cylindrical body. Furthermore, the panel 58 has a second sidewall 581 at its right side and is provided with a plurality of protrusions 582 on its top and bottom sides. The hollow cylindrical body of the slider 5 can be fitted into the bores 210, 220 of the tube 1 and the neck portion 55 can be inserted through the elongated opening 25. When the air compressor is stopped, the first sidewall 40 of the stationary transparent plate 4 is adjacent to the left side of the panel 58, and the second sidewall 581 of the panel 58 is adjacent to the right side of the stationary transparent plate 4. The protrusions 582 of the panel 58 are in contact with two opposing side surfaces 41 of the recessed space 43 to facilitate the panel 58 to move together with the hollow cylindrical body of the slider 5 along the recessed space 43 of the stationary transparent plate 4. Furthermore, the panel 58 is provided with a layer of pressure-indicating scale 583 at its outer surface.

Figure 4:
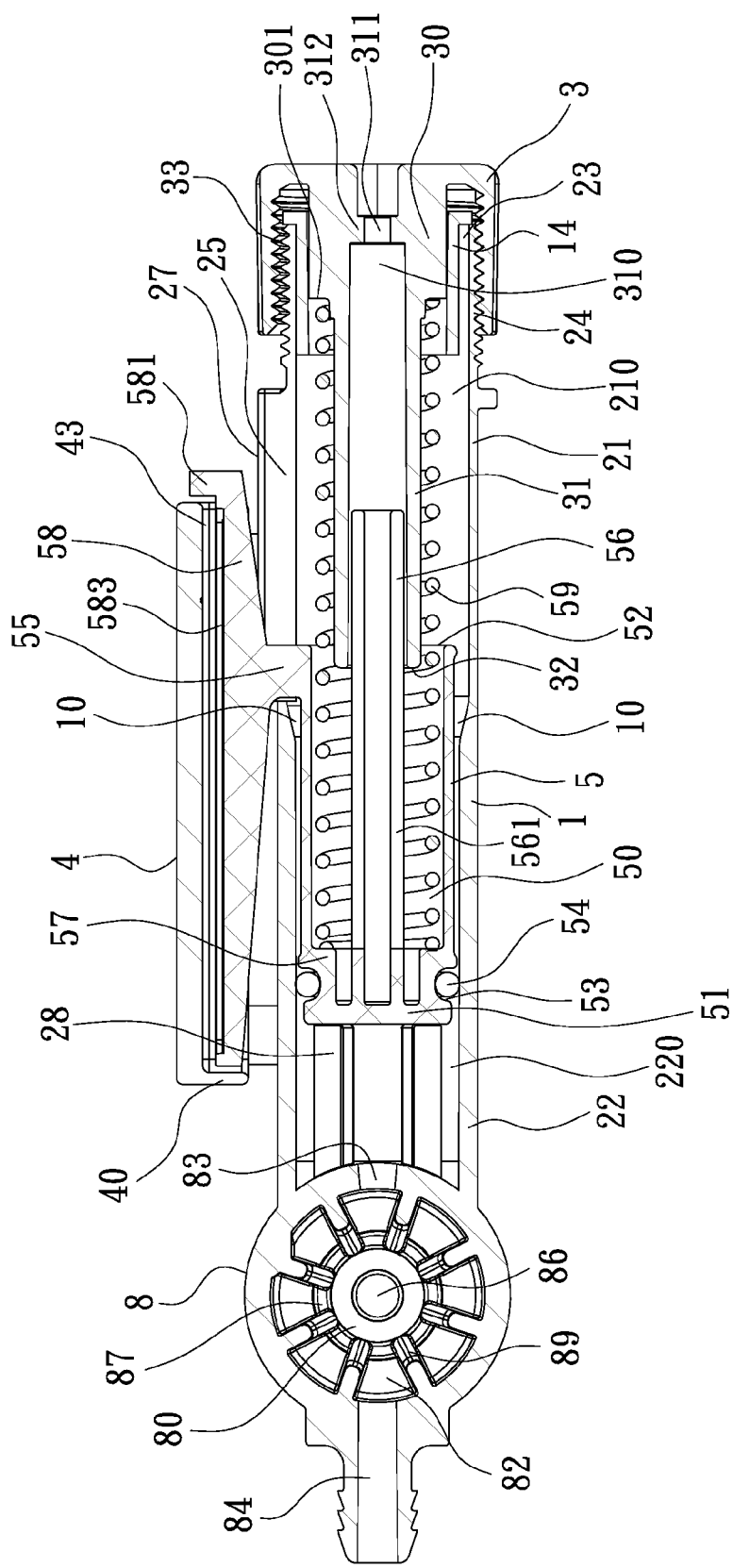
FIG. 4 shows a sectional view of the air storage container with the pressure indicator.

The coiled compression spring 59 is fitted into the inner space 50 of the slider 5, around the first central tube 56, wherein one end of the coiled compression spring 59 is urged against the inner step 57 of the closed end 51 of the slider 5, as shown in FIG. 4. The coiled compression spring 59 of the pressure indicator may slightly contact the inner surfaces that define the inner space 50 of the slider 5. The slider 5 is received in the tube 1 and forced by the coiled compression spring 59, so that the slider 5 is urged against the buffering blocks 28 provided on the air storage container 8. The outlet 83 communicates with the second bore 220 of the second segment 22 of the tube 1, so that the compressed air within the air storage chamber 8 can flow into the second bore 220 of the second segment 22 to force the slider 5 to move along the second bore 220 and the first bore 210 towards the open end 23, as shown in FIGS. 7 through 10.

Figure 2:
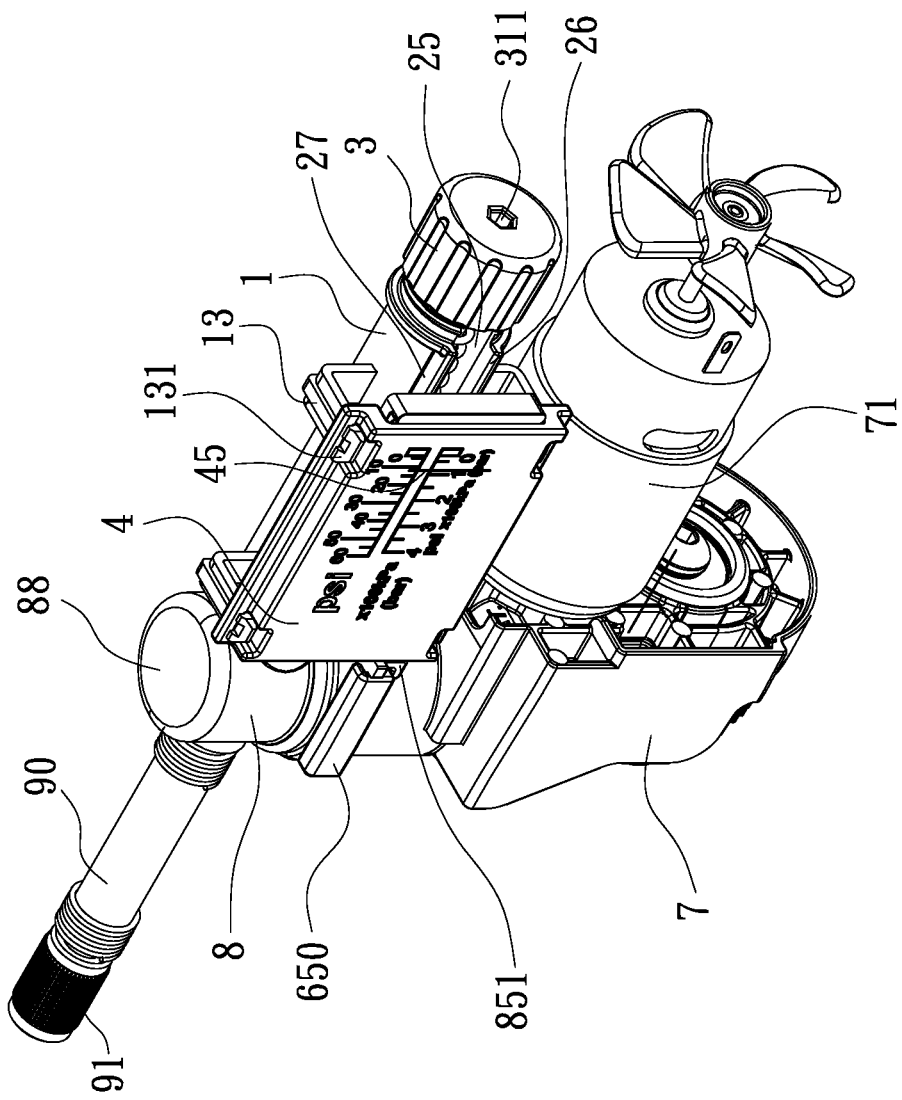
FIG. 2 shows a 3-dimensional view of the air compressor of the embodiment of the present invention, wherein the air storage container is assembled to the cylinder.
Figure 3:
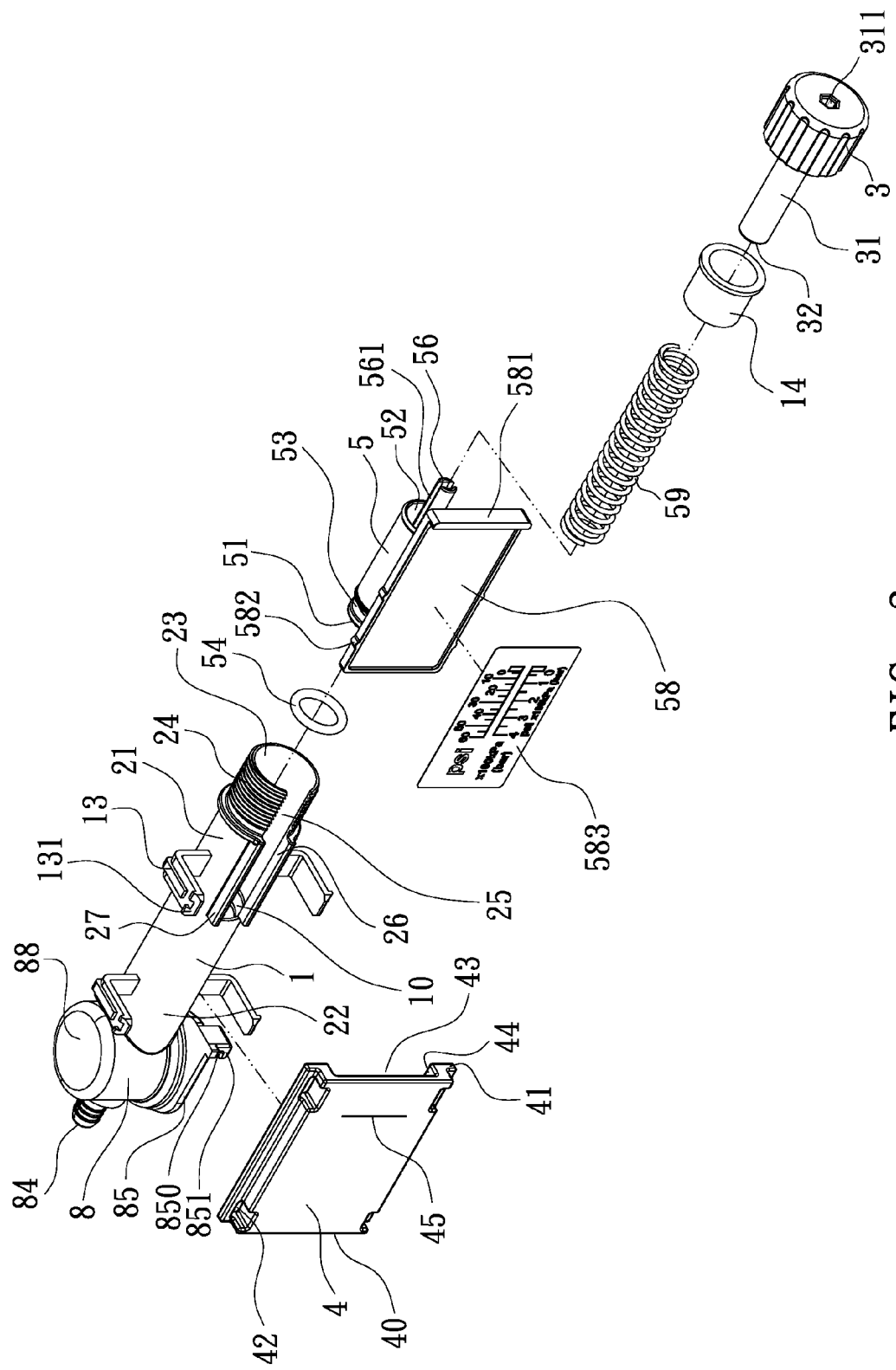
FIG. 3 shows an exploded view of a pressure indicator used in the present invention.

Referring to FIGS. 3 and 4, the cap 3 has an inner base 30 and a second central tube 31 extending from the inner base 30, wherein the second central tube 31 has a diameter less than the inner base 30, thus forming an annular surface 301 therebetween. The second central tube 31 defines therein a central hole 310 that extends from a bottom wall 312 thereof to an open end 32 thereof, wherein the bottom wall 312 defines a vent 311, through which the compressed air from the air storage container 8 can be released into the ambient environment. The diameter of the central hole 310 of the second central tube 31 of the cap 3 is greater the external diameter of the first central tube 56. The external diameter of the second central tube 31 of the cap 3 is less than the internal diameter of the coiled compression spring 59. The cap 3 is provided at its inner surface with internal threads 33 corresponding to the external threads 24 of the first segment 21 of the tube 1. The sleeve 14 is fitted around the inner base 30 of the cap 3. When mounting the cap 3 to the tube 1, the second central tube 31 of the cap 3 will receive the first central tube 56 of the slider 5. The cap 3 is mounted to the tube 1 by engaging the internal threads 33 of the cap 3 with the external threads 24 of the first segment 21 of the tube 1. The other end of the coiled compression spring 59 is inserted into the sleeve 14 and urged against the annular surface 301 between the inner base 30 and the second central tube 31. The compression of the coiled compression spring 59 can be adjusted by the depth of the cap 3 being threadedly mounted to the open end 23 of the first segment 21, so that the pressure of the compressed air can be measured more properly. FIG. 2 shows the assembled pressure indicator of the present invention, which is obtained by assembling the tube 1, the stationary transparent plate 4, the slider 5, the coiled compression spring 59, the sleeve 14, and the cap 5.

Figure 6:
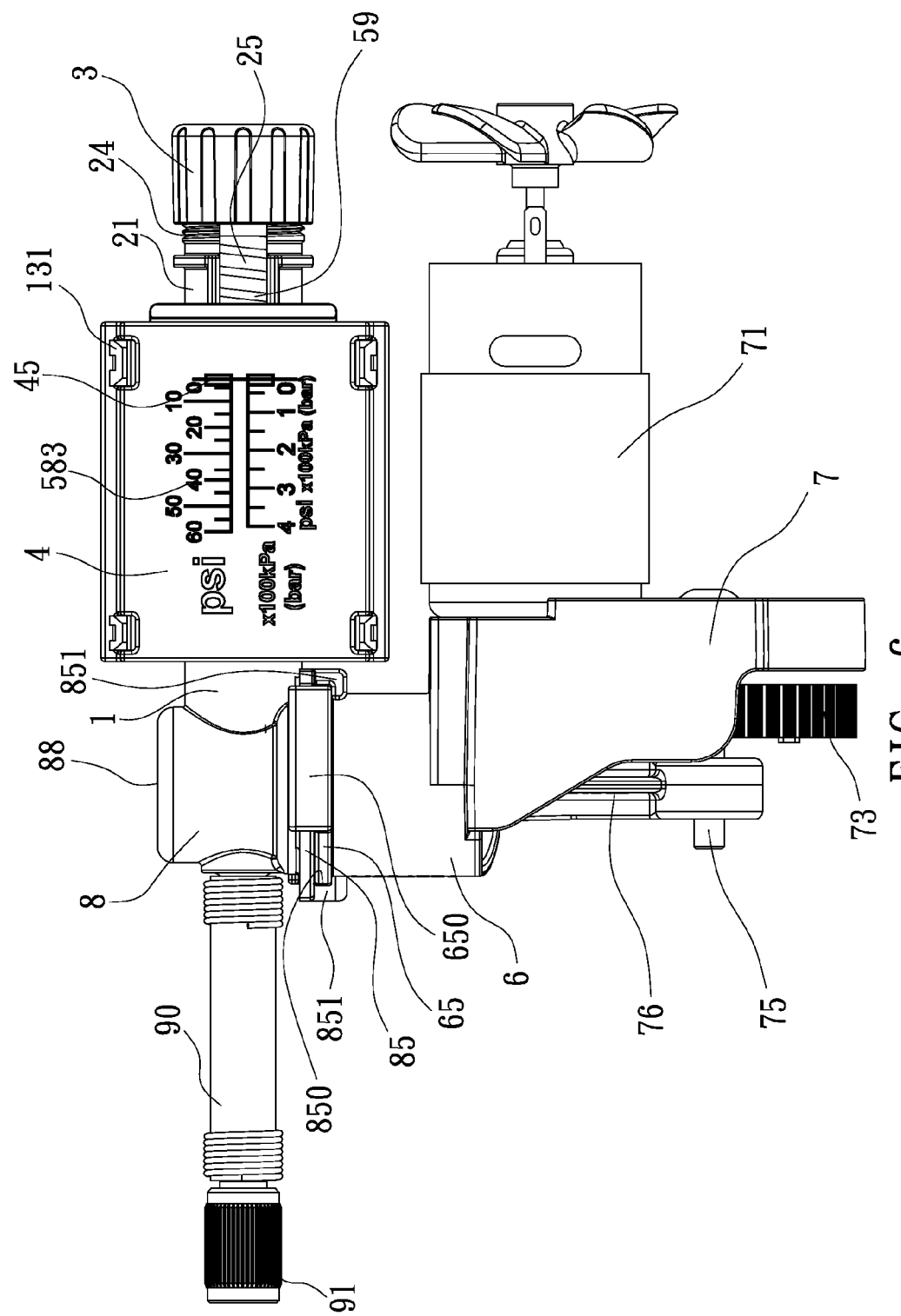
FIG. 6 shows a plan view of the air compressor of the embodiment of the present invention, wherein the pressure indicator is at its original position (the air compressor is stopped).
Figure 8:
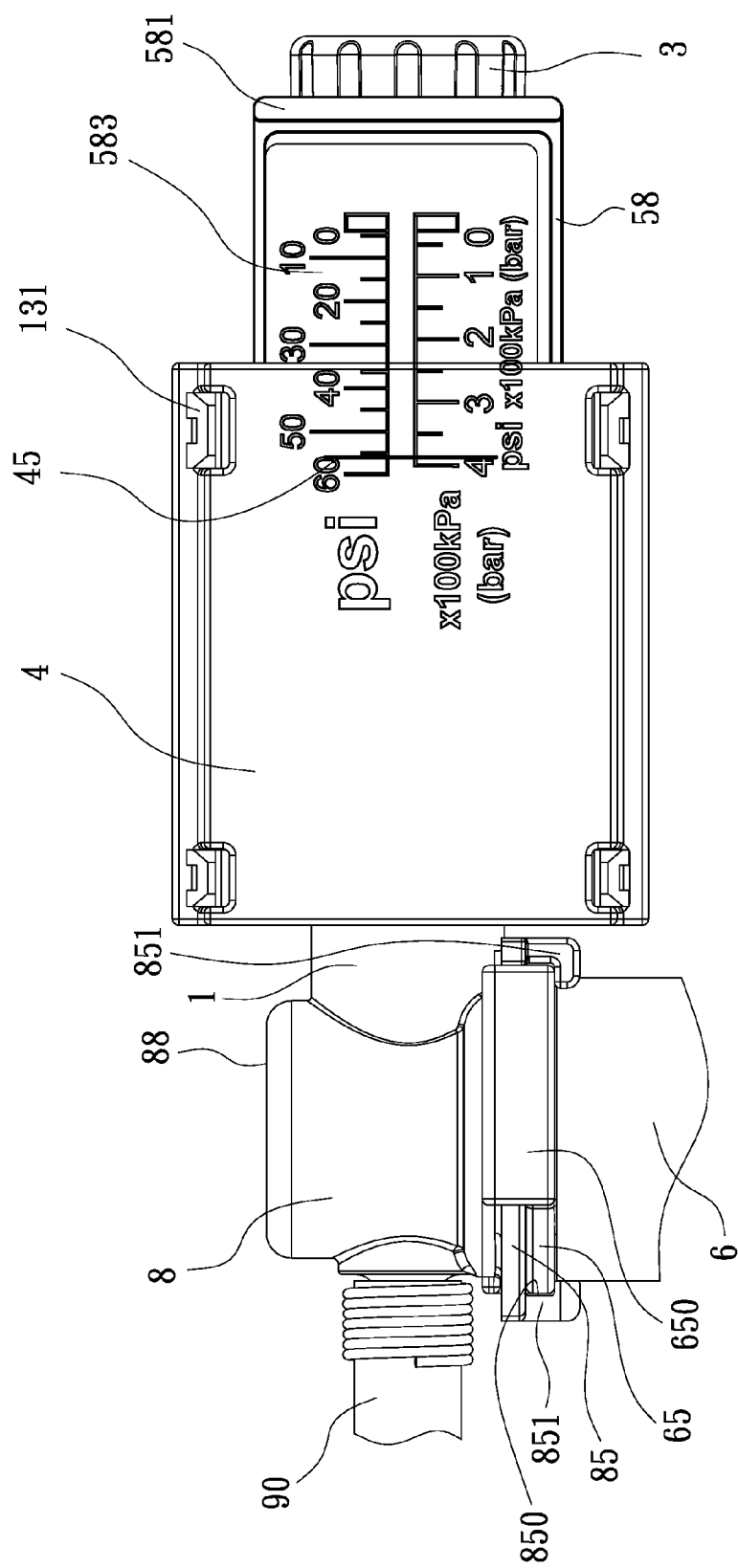
FIG. 8 shows a plan working view of the pressure indicator used in the present invention, wherein the slider is forced by compressed air to move towards the open end of the tube.
Figure 9:
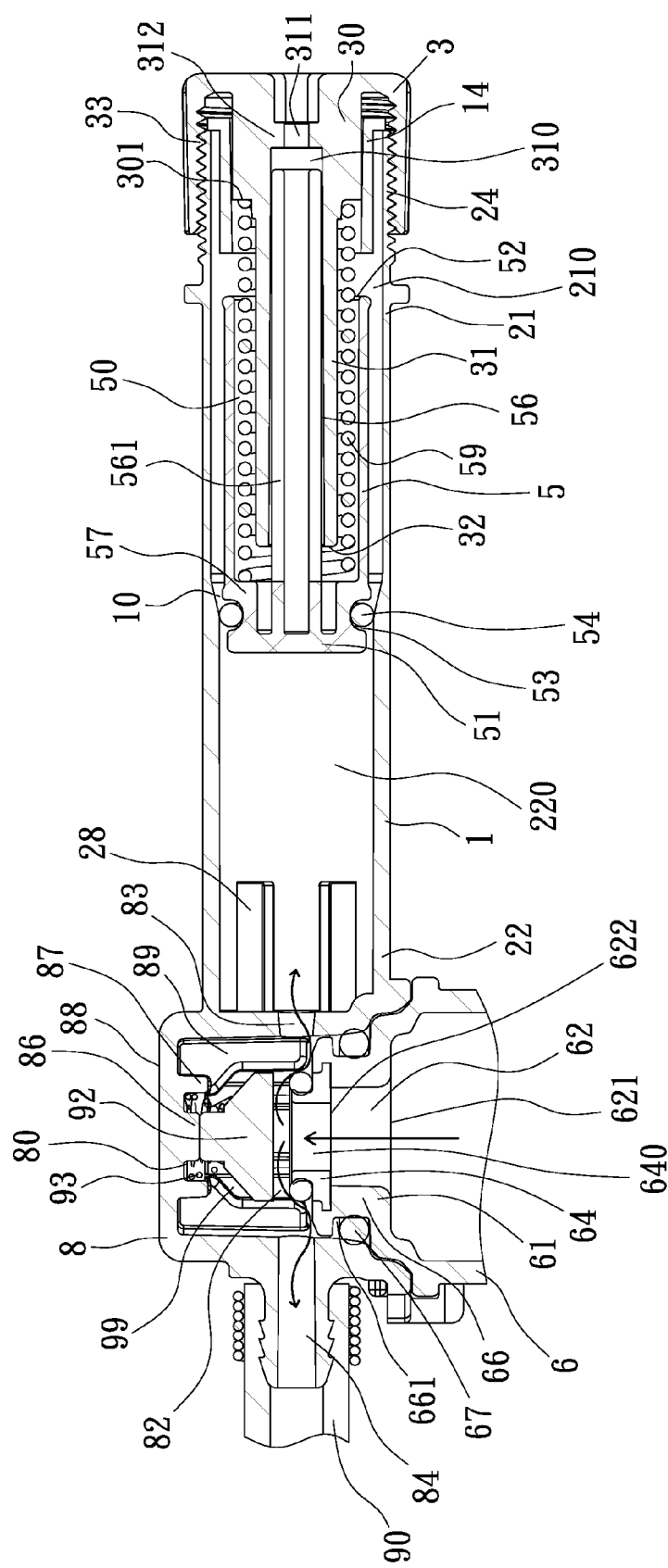
FIG. 9 shows a sectional working view of the pressure indicator used in the present invention, wherein the slider is forced by compressed air to move towards the open end of the tube.
Figure 10:
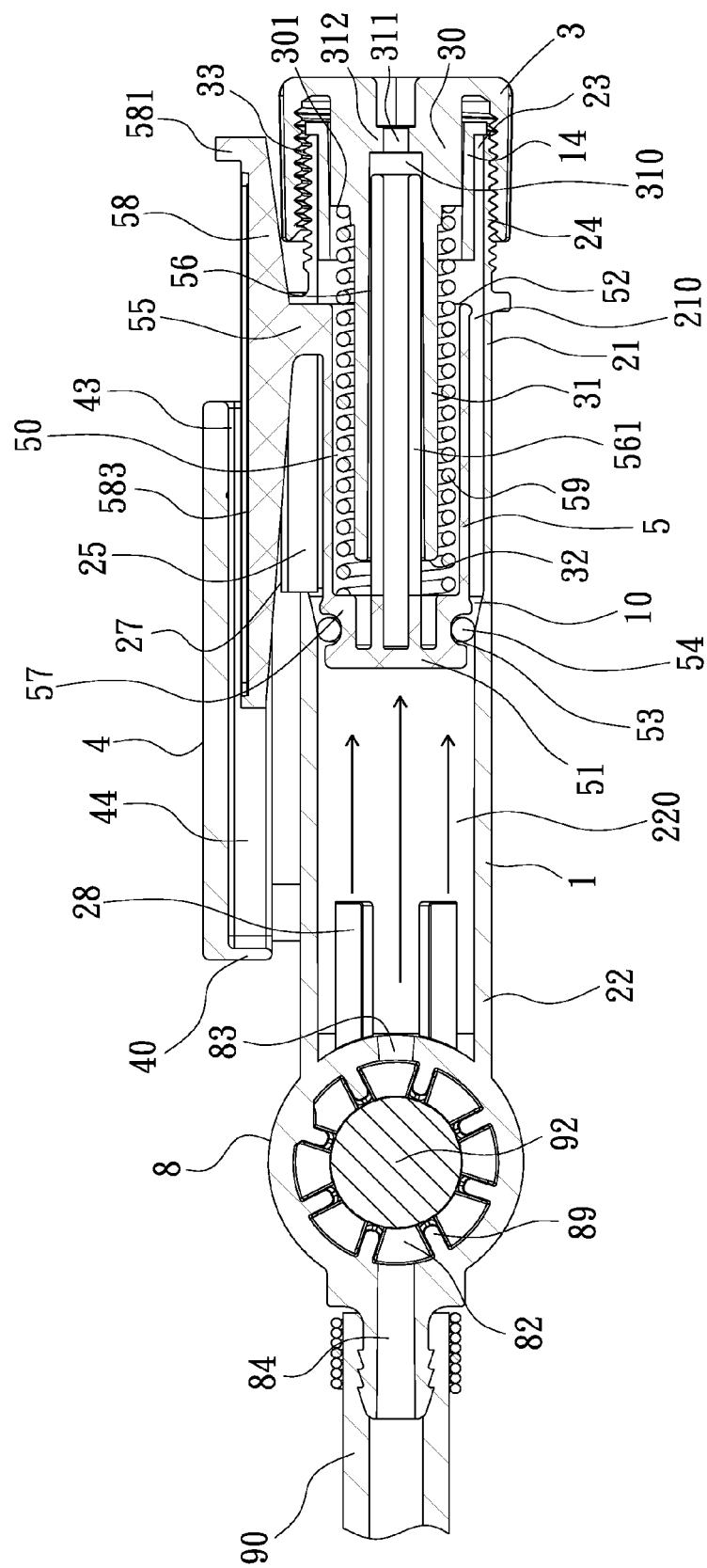
FIG. 10 shows a sectional working view of the pressure indicator used in the present invention, wherein the slider is forced by compressed air to move towards the open end of the tube.
Figure 11:
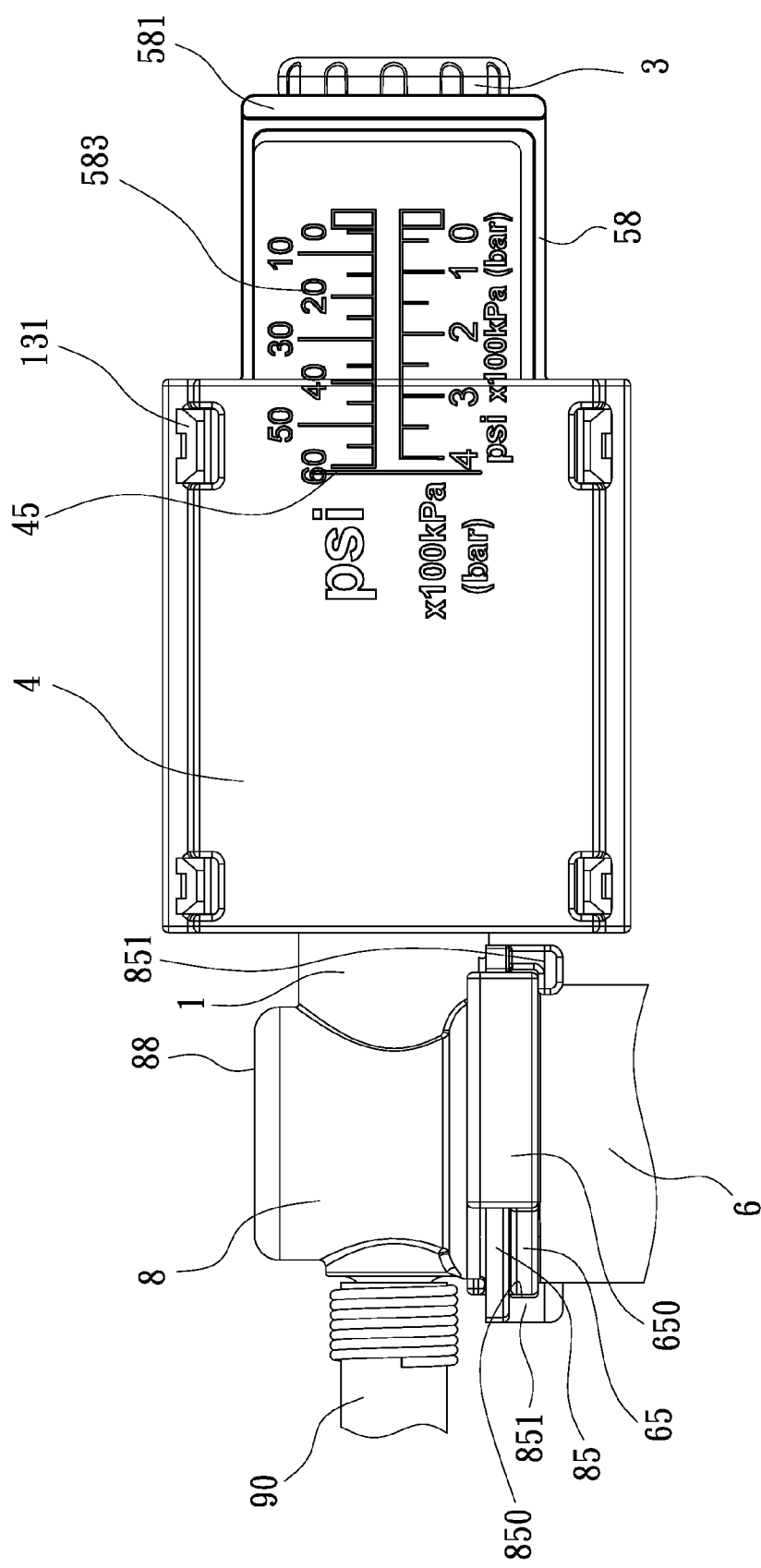
FIG. 11 shows a plan working view of the pressure indicator used in the present invention, wherein the slider is moved to its final position by the compressed air.
Figure 12:
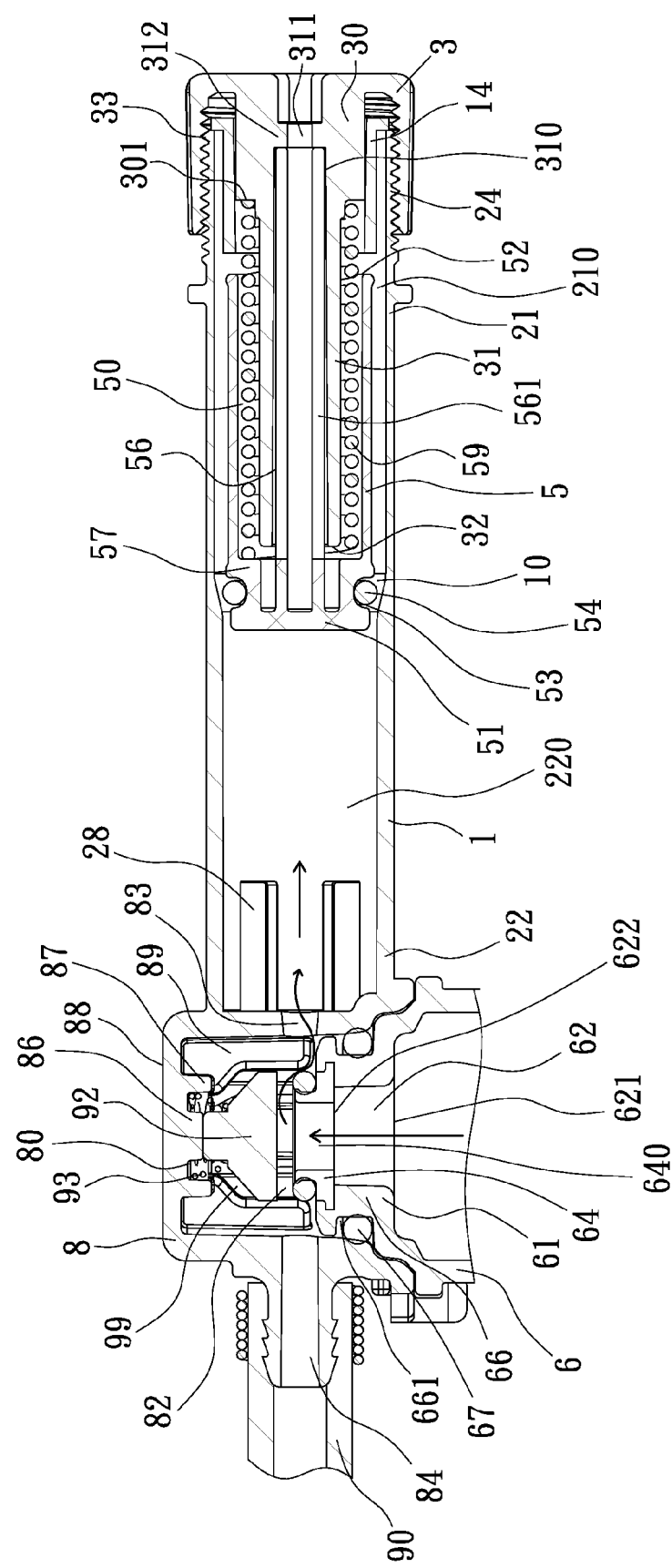
FIG. 12 shows a sectional working view of the pressure indicator used in the present invention, wherein the slider is moved to its final position by the compressed air.
Figure 13:
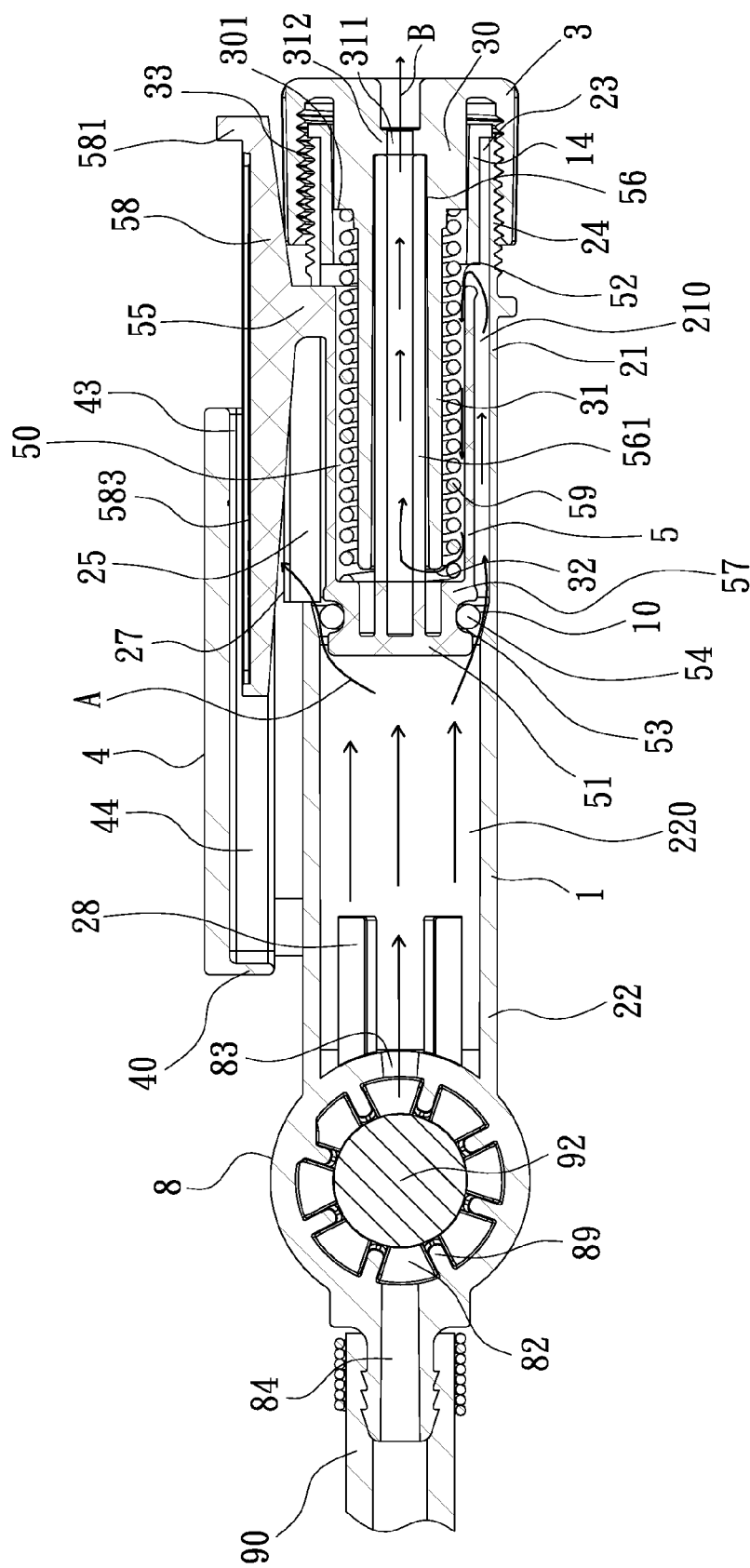
FIG. 13 shows a sectional working view of the pressure indicator used in the present invention, wherein the slider is moved to its final position by the compressed air.

FIGS. 4, 6 and 7 show a state of the pressure indicator, wherein the air compressor is stopped; namely, the pressure indicator does not receive compressed air from the air storage cylinder 8. When the air compressor is running, as shown in FIGS. 8, 9 and 10, the compressed air within the air storage container 8 can flow into the tube 1 via the outlet 83 to force the slider 5 to move towards the open end 23. The movement of the slider 5 will compress the coiled compression spring 59. According to the pressure-indicating scale 583, the position of the marking line 45 provided on the stationary transparent plate 4, which reflects the pressure of the compressed air within the air storage container 8, can be clearly seen through by a user. After having completed an operation such as inflating a tire, the air compressor can be stopped. Therefore, the pressure indicator can return to its original state, as shown by FIGS. 4, 6 and 7. Furthermore, in operation, when the pressure of the compressed air within the air storage container 8 exceeds a permissible pressure set for the air compressor, the colored O-ring 54 can be moved together with the slider 5 to reach the tapered annular surface 10 of the tube 1 (see FIG. 13), and thus an excess of compressed air can flow into the first bore 210 via the gap between the colored O-ring 54 and the tapered annular surface 10 and then flow out of the pressure indicator via the elongated opening 25, as shown by the flow path (A) in FIG. 13. At the same time, an excess of compressed air can sequentially pass through the first bore 210 of the first segment 21, the inner space 50 of the slider 5, and the vent 311 to be released into the ambient environment, as shown by the flow path (B) in FIG. 13. Furthermore, the bottom wall 312 can limit a further movement of the slider 5 to prevent the flow path (B) of the compressed air from being blocked (see FIGS. 12 and 13), thus ensuring an effective release of excess compressed air.

As a summary, one feature of the present invention is that the air storage container 8 can be detachably mounted to the cylinder 6 to define an air chamber 99. A second feature of the present invention is that the first through hole 62 of the tubular projection 66 can reduce the motion resistance of the piston body 76 within the cylinder 6, so that the piston body 76 can be moved more smoothly. A third feature of the present invention is that the metal seat 64 can undergo high frequency movement of the valve plug 92 without deformation, so that the sealing effect of the valve plug 92 can be ensured. A fourth feature of the present invention is that the air storage container 8 is provided at an outlet thereof with a pressure indicator, which can reflect the pressure of the compressed air within the air storage container 8, and furthermore, which allows excess compressed air to be released into the ambient environment without installing additional safety valves or pressure relief valves, so that objects, such as tires, can be prevented from being overly inflated.

I claim:

1. An air compressor, which comprises:
   a main frame;
   a cylinder fitted with a piston body and provided at the main frame; and
   a motor mounted to the main frame, the motor capable of driving the piston body to conduct reciprocating motion within the cylinder for producing compressed air;
   wherein the cylinder has an open bottom, through which the piston body is fitted into the cylinder, and a top wall opposite to the open bottom, the top wall being not fully closed, wherein the cylinder is provided with a first flange at its surrounding wall, near its top wall, the first flange being provided with two opposite holding portions each defining a first recess; an air storage container has an open bottom and a closed top and defines therein an inner space terminating at its open bottom, the air storage container being provided at its open bottom with a second flange that is provided with two opposite holding portions each defining a second recess; whereby the air storage container is capable of being fitted over the cylinder and rotated about the cylinder to allow the second flange of the air storage container to slide in the first recess of the cylinder and allow the first flange of the cylinder to slide in the second recess of the air storage container, so that the air storage container is detachably mounted to the cylinder, thereby sealing the cylinder and defining an air chamber therebetween;
   further wherein the air storage container is provided with at least two outlets, one of which is connected with a pressure indicator and another of which is connected with a hose provided with an air nozzle, wherein the pressure indicator includes:
   a main tube that has a first segment and a second segment, the second segment being joined to one outlet of the air storage container and defining therein a second bore, the first segment being formed integrally with the second segment and having an open end and defining therein a first bore that communicates with the second bore and terminates at its open end, the first bore having a diameter greater than the second bore, a tapered annular surface formed between an inner surface of the first segment, which defines the first bore, and an inner surface of the second segment, which defines the second bore, the first segment defining at its surrounding wall an elongated opening extending from the tapered annular surface to its open end;
   a stationary transparent plate provided with a marking line and detachably fixed onto the tube;
   a slider including a hollow cylindrical body having a closed end and an open end and defining therein an inner space that terminates at the open end, the cylindrical body being provided with a first central tube that extends from an inner surface of its closed end and extends through its inner space, the slider further including a panel that is joined to the hollow cylindrical body through a neck portion such that the panel is parallel to the main tube, the hollow cylindrical body being fitted into the main tube and the neck portion being inserted through the elongated opening, so that the panel is capable of moving together with the hollow cylindrical body, the panel being provided with a layer of pressure-indicating markings at its outer surface;
   a coiled that compression spring fitted into the inner space of the slider, around the first central tube; and
   a cap that has an inner base and a second central tube extending from the inner base, the second central tube defining therein a central hole, the diameter of the central hole of the second central tube of the cap being greater than the external diameter of the first central tube of the slider, the external diameter of the second central tube of the cap being less than the internal diameter of the coiled compression spring;
   whereby the compressed air contained in the air storage container can flow into the inner space of the second segment of the main tube via the outlet and thus force the slider to move along the second bore and the first bore towards the open end of the first segment of the main tube, so that the position of the marking line of the stationary transparent plate relative to the pressure-indicating markings on the panel of the slider can reveal the pressure of the compressed air within the air storage container, and furthermore, when the compressed air exceeds a predetermined pressure set for the air compressor, the compressed air can be released into the ambient environment through the elongated opening.

2. The air compressor of claim 1, wherein the main tube is provided at the open end of the first segment with external threads and provided at its surrounding wall with a plurality of fixing arms, each fixing arm being provided with a snap-fitting hook at its end, and the stationary transparent plate defines a plurality of openings corresponding to the snap-fitting hooks of the fixing arms, whereby the stationary transparent plate can be detachably fixed onto the main tube by inserting the snap-fitting hooks into the openings of the stationary transparent plate.

3. The air compressor of claim 2, wherein the closed end of the hollow cylindrical body of the slider is formed with an inner step around the first central tube; the cap is provided at its inner surface with internal threads corresponding to the external threads of the first segment of the tube, and an annular surface is formed between the second central tube and the inner base of the cap, the central hole of the second central tube extending from a bottom wall of the central tube to an open end of the central tube, the bottom wall defining a vent, through which the compressed air from the air storage container can be released into the ambient environment; a sleeve is fitted around the inner base of the cap; wherein the cap is mounted to the main tube by engaging the internal threads of the cap with the external threads of the first segment, one end of the coiled compression spring being urged against the inner step of the closed end of the slider, the other end of the coiled compression spring being inserted into the sleeve and urged against the annular surface between the inner base and the second central tube, the compression of the coiled compression spring being adjusted by the depth of the cap being threadedly mounted to the open end of the first segment, so that the pressure of the compressed air can be measured more properly.

4. The air compressor of claim 2, wherein the stationary transparent plate is a generally rectangular structure that defines at its back surface a recessed space being parallel to the main tube and has a first sidewall at its left side; the panel has a second sidewall at its right side and is provided with a plurality of protrusions on its top and bottom sides, the panel of the slider capable of moving along the recessed space of the stationary transparent plate, wherein the first sidewall of the stationary transparent plate is adjacent to the left side of the panel whereas the second sidewall of the panel is adjacent to the right side of the stationary transparent plate when the air compressor is stopped, and the protrusions of the panel contacts two opposing side surfaces of the recessed space to facilitate the movement of the panel.

5. The air compressor of claim 1, wherein the hollow cylindrical body of the slider defines an annular groove at its surrounding wall, near its closed end to be fitted with a colored O-ring, whereby when the compressed air exceeds a predetermined pressure set for the air compressor, the colored O-ring will be moved together with the slider to reach the tapered annular surface of the tube, so that the compressed air can pass through the gap between the tapered annular surface and the colored O-ring to enter the second bore of the second segment and then pass through the elongated opening to be released into the ambient environment.

\* \* \* \* \*